US011560448B2

(12) United States Patent
Abecassis-Wolfovich et al.

(10) Patent No.: US 11,560,448 B2
(45) Date of Patent: Jan. 24, 2023

(54) ANTIMONY FREE FLAME-RETARDED EPOXY COMPOSITIONS

(71) Applicant: BROMINE COMPOUNDS LTD., Beer Sheva (IL)

(72) Inventors: Meyrav Abecassis-Wolfovich, Meitar (IL); Smadar Swissa, Meitar (IL)

(73) Assignee: BROMINE COMPOUNDS LTD., Beer Sheva (IL)

( * ) Notice: Subject to any disclaimer, the term of this patent is extended or adjusted under 35 U.S.C. 154(b) by 40 days.

(21) Appl. No.: 16/469,429

(22) PCT Filed: Dec. 14, 2017

(86) PCT No.: PCT/IL2017/051346
§ 371 (c)(1),
(2) Date: Jun. 13, 2019

(87) PCT Pub. No.: WO2018/109766
PCT Pub. Date: Jun. 21, 2018

(65) Prior Publication Data
US 2020/0123309 A1 Apr. 23, 2020

Related U.S. Application Data

(60) Provisional application No. 62/476,800, filed on Mar. 26, 2017, provisional application No. 62/433,811, filed on Dec. 14, 2016.

(51) Int. Cl.
| | | |
|---|---|---|
| C08G 59/24 | (2006.01) | |
| C08G 59/30 | (2006.01) | |
| C08K 3/32 | (2006.01) | |
| C08K 5/136 | (2006.01) | |
| C08L 63/00 | (2006.01) | |
| C09K 21/12 | (2006.01) | |
| C09K 21/08 | (2006.01) | |

(52) U.S. Cl.
CPC ........... *C08G 59/245* (2013.01); *C08G 59/30* (2013.01); *C08K 3/32* (2013.01); *C08K 5/136* (2013.01); *C08L 63/00* (2013.01); *C08K 2003/323* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 4,147,636 A | 4/1979 | Drake et al. | |
| 4,321,351 A * | 3/1982 | Zuppinger | C08G 59/42 257/E21.502 |
| 4,992,496 A | 2/1991 | Green | |
| 5,854,371 A | 12/1998 | Horold | |
| 8,524,125 B2 | 9/2013 | Mazor et al. | |
| 2003/0153656 A1 | 8/2003 | Sjerps | |
| 2004/0110878 A1 * | 6/2004 | Knop | C08K 5/5313 524/115 |
| 2004/0138351 A1 | 7/2004 | Kaprinidis et al. | |
| 2005/0020800 A1 | 1/2005 | Levchik et al. | |
| 2007/0004872 A1 * | 1/2007 | Lu | C08L 63/00 525/396 |
| 2009/0117797 A1 | 5/2009 | Mazor et al. | |
| 2011/0201724 A1 | 8/2011 | Levchik et al. | |
| 2013/0032375 A1 * | 2/2013 | Georlette | H01B 7/295 174/110 SR |
| 2016/0215443 A1 | 7/2016 | Rapaport et al. | |

FOREIGN PATENT DOCUMENTS

| | | |
|---|---|---|
| CH | 628913 A5 | 3/1982 |
| CN | 1380370 A | 11/2002 |
| CN | 1639174 A | 7/2005 |
| CN | 1711313 A | 12/2005 |
| CN | 1948392 A | 4/2007 |
| CN | 101058693 A | 10/2007 |
| CN | 101111562 A | 1/2008 |
| CN | 101218305 A | 7/2008 |
| CN | 101484548 A | 7/2009 |
| CN | 101978110 A | 2/2011 |
| CN | 102203176 A | 9/2011 |
| CN | 103450781 A | 12/2013 |
| CN | 103571304 A | 2/2014 |
| CN | 104130664 A | 11/2014 |
| CN | 104592674 A | 5/2015 |
| CN | 104629259 A | 5/2015 |
| CN | 105556028 A | 5/2016 |

(Continued)

OTHER PUBLICATIONS

International Search Report and Written Opinion issued for PCT application No. PCT/IL2017/051346 dated Feb. 27, 2018, 12 pages.
"Risk Reduction Monograph No. 3: Selected Brominated Flame Retardants. Background and National Experience with Reducing Risk" Organisation for Economic Co-operation and Development; Paris; 1994; Retrieved from the Internet. URL: http://www.oecd.org/officialdocuments/publicdisplaydocumentpdf/?cote=ocde/gd(94)96&doclanguage=en (Nov. 8, 1994), 152 pages.
Rakotomalala M. et al.; "Recent Developments in Halogen Free Flame Retardants for Epoxy Resins for Electrical and Electronic Applications;" Materials; Aug. 2010.; 11; 3 (8):4300-27.
Neil E. D. and Levchik S.; "A Review of Current Flame Retardant Systems for Epoxy Resins;" Journal of Fire Sciences; 2004; 22 (1):25-40.
Office Action Issued for Chinese Patent Application No. 201780077829.3 dated Aug. 17, 2020, with English translation, 12 pages.

(Continued)

*Primary Examiner* — Randy P Gulakowski
*Assistant Examiner* — Ha S Nguyen
(74) *Attorney, Agent, or Firm* — Rothwell, Figg, Ernst & Manbeck, P.C.

(57) ABSTRACT

A curable epoxy composition suitable for surface application, comprising one or more epoxy resin (s); 2, 4, 6-tribromophenyl end-capped tetrabromobisphenol A epoxy-based flame retardant; and phosphorus-containing compound selected from the group consisting of one or more of: ammonium polyphosphate; resorcinol bis (diphenyl phosphate); and liquid alkylated triphenyl phosphate ester. The composition is substantially $Sb_2O_3$-free.

6 Claims, No Drawings

(56) References Cited

FOREIGN PATENT DOCUMENTS

| CN | 105694665 A | 6/2016 | | |
|---|---|---|---|---|
| CN | 106047080 A | 10/2016 | | |
| EP | 0467364 A1 | 1/1992 | | |
| JP | 54-113630 A | 9/1979 | | |
| JP | S61205135 A | 9/1986 | | |
| JP | 03234726 A | * | 10/1991 | |
| JP | 07247206 A | * | 9/1995 | ............. C04B 22/16 |
| JP | H07-247206 A | 9/1995 | | |
| KR | 100786474 B1 | 12/2007 | | |
| KR | 2013-023439 A | 3/2013 | | |
| KR | 2016-149728 A | 12/2016 | | |
| TW | 224980 B | 6/1994 | | |
| WO | 0142359 A1 | 6/2001 | | |
| WO | 2007/132463 A1 | 11/2007 | | |
| WO | 2011/117865 A1 | 9/2011 | | |
| WO | 2015/036998 A1 | 3/2015 | | |
| WO | WO-2015036998 A1 | * | 3/2015 | ........... C08G 59/308 |

OTHER PUBLICATIONS

Weil et al., "A Review of Current Flame Retardant Systems for Epoxy Resins", Journal of Fire Sciences, (2004) vol. 22 issue: 1, pp. 25-40.
Rakotomalala, et al., "Recent Developments in Halogen Free Flame Retardants for Epoxy Resins for Electrical and Electronic Applications", Materials 2010, 3(8), 4300-4327.
Extended European Search Report Issued for European Patent Application No. 17881186.5 dated Jul. 6, 2020, 6 pages.
Office Action issued for Chinese Patent Application No. 201780077829.3 dated Sep. 8, 2021, with partial English Translation, 13 pages.

* cited by examiner

ANTIMONY FREE FLAME-RETARDED EPOXY COMPOSITIONS

CROSS REFERENCE TO RELATED APPLICATION(S)

The present application is a 35 U.S.C. § 371 National Phase Entry Application from PCT/IL2017/051346, filed on Dec. 14, 2017, and designating the United States, which claims the benefits of priority to US Application Nos. 62/433,811, filed on Dec. 14, 2016, and 62/476,800, filed on Mar. 26, 2017, the disclosures of which are incorporated herein by reference in their entirety for all purposes.

The present invention relates to the field of flame-retardants and, more particularly, to novel antimony free flame retardant systems for coatings, paints, composites and adhesives, their preparation and efficacy (flame retardancy) in the final applications.

Coatings are an essential part of everyday life both in decorative and functional applications. Consequently, coating flammability is a serious industrial concern. For example, fire protection has been recognized as a crucial part of public and commercial building design.

There are two types of coatings on the market that are designed for use on different substrates and that respond very differently when exposed to fire.

Fire retardant paints are applied to combustible materials (wood, plastic, foam) and are designed to reduce the rate of flame spread. They look like paints and are formulated to be applied like paints (brush, roller or spray). They do burn, can generate smoke, do not have high temperature resistance and would vaporize under test conditions designed for fire resistant coatings. Many fire-retardant coatings are only rated for the ability to 'not contribute' to a fire, i.e. they will not become a fuel source. Others do provide some resistance in keeping the fire from getting to the substrate.

Most create a soft char that will not keep plastics from melting and dripping into a fire.

Fire resistant paints provide insulation to the substrate. Intumescent fire resistant paints and coatings work by expanding their volume from 15 to 30 times and generating an ash-like char layer that erodes as fire exposure continues. Fire resistant coatings are much thicker than fire retardant paints and are either sprayed or troweled on. Epoxy coatings are often used in industrial and automotive applications since they are more heat resistant than latex-based and alkyd-based paints. Two-part epoxy coatings were developed for heavy duty service on metal substrates and use less energy than heat-cured powder coatings. These systems provide a tough, protective coating with excellent hardness. Some epoxy coatings are formulated as an emulsion in water, and can be cleaned up without solvents. Epoxy resins are also used for decorative flooring applications such as terrazzo flooring, chip flooring, and colored aggregate flooring. In addition, the use of epoxy systems is common in the composite world. It is frequently used with continuous carbon fiber in aerospace, race car, marine and other high-performance applications. Hence, there is an ongoing search for flame retarded epoxy coatings.

Bromine-containing organic compounds are common flame retardants (FRs) for plastics. Antimony trioxide (ATO; hereinafter also identified by its chemical formula $Sb_2O_3$) is used as a synergist for bromine-based FRs. It allows reduction of the amount of bromine required to achieve flame retardancy. The flammability characteristics of flammable compositions are usually quantifiable according to a method specified by Underwriter Laboratories standard UL 94, where an open flame is applied to the lowermost edge of a vertically mounted test specimen made of the tested polymer formulation. The specimens used in the UL 94 test method vary in thickness (typical thicknesses are ~3.2 mm, ~1.6 mm, ~0.8 mm and ~0.4 mm). During the test, various features of the flammability of the test specimens are recorded. Then, according to the classification requirements, the polymer formulation is assigned with either V-0, V-1 or V-2 rating at the measured thickness of the test specimen. Polymer formulation assigned with the V-0 rating is the less flammable.

For example, U.S. Pat. No. 5,854,371 indicates that to reach self-extinguishing compositions of epoxy resins employed in the production of coatings—with the aid of a bromine-containing compound as a sole flame retardant—an amount of about 20% by weight bromine is needed in the composition; and that antimony trioxide is frequently added (the amount of bromine added to a flammable material is calculated by multiplying the bromine content of the added flame retardant by the weight concentration of that flame retardant in the flammable material). Indeed, experimental work conducted in support of this invention shows that the presence of bromine-containing flame retardant in a curable composition of epoxy resin at a concentration sufficient to supply ~20% bromine content in the composition results in UL 94 V-1/3.2 mm rating for the cured specimen. Absent antimony trioxide, UL V-0 rating is difficult to achieve even at a high loading level of flame retardants.

Lately, the safety of ATO has been called into serious question and its use is in the process of being limited in some applications. There are therefore many attempts to find efficient ATO replacements worldwide, but with no commercial success.

ATO-free systems in coatings have been available when using phosphorus-based flame retardants, but these are less efficient compared to brominated FRs and do not provide a flame retardant solution on difficult substrates which have a high propensity to ignite.

Illustrative compositions based on epoxy resins employed in the preparation of coatings, where flammability has been reduced with the aid of bromine-containing flame retardants, phosphorus-containing flame retardants, frequently together with antimony trioxide or inorganic fillers with extinguishing effect, such as aluminum hydroxide and magnesium hydroxide, wherein the compositions further comprise an epoxy curing agent and auxiliary additives can be found in: JP 54-113630 [a coating suitable for metal surfaces, comprising liquid epoxy resin, halogenated aromatic flame retardant, phosphate and an epoxy curing agent]; CN 103571304 [where an epoxy resin (40 parts by weight) is flame retarded with tetrabromobisphenol A (20 parts by weight) in the presence of antimony trioxide]; KR 2013-023439 [where solvent-free formulation for use as conductive coating is prepared, with epoxy resin, brominated epoxy resin and phosphate flame retardant]; CN 104130664 [where an epoxy resin (100 phr) is flame retarded with brominated epoxy resin (50 phr), phosphate flame retardant (20 phr) and antimony trioxide (5 phr)]; KR 2016-149728 [layered coating configuration, with brominated epoxy resin flame retardant, decabromodiphenylethane, triphenyl phosphate, ammonium polyphosphate and aluminum hydroxide]; CN 105694665 [where an epoxy resin (50 parts) is flame retarded with brominated epoxy resin (10 parts), dibromocresol glycidyl ether (5 parts) and a flame retardant additive (25 parts), consisting of antimony trioxide, chlorinated paraffin, aluminum hydroxide and a phosphate compound]; and CN 106047080 [where a solvent-based epoxy floor paint is formulated using bisphenol A type epoxy resin (35-50 parts), brominated epoxy resin (12-20 parts) and phosphate ester (4-7 parts)].

The present invention illustrates the successful preparation of stable antimony-free brominated FR formulations, their use as flame-retardants in epoxy coating applications and epoxy coatings obtained as a result of this application.

The composition of the invention is substantially $Sb_2O_3$-free. By "substantially $Sb_2O_3$-free" is meant that the concentration of antimony trioxide in the composition is well below the acceptable amount used in epoxy-based formulation in conjunction with halogenated additives, e.g., not more than 1.0% by weight, more preferably, up to 0.5% by weight, e.g., 0.0-0.3% by weight, for example, 0.0-0.1% by weight (based on the total weight of the composition). Most preferably, the compositions of the invention are totally devoid of antimony trioxide or other antimony compounds. The compositions of the invention are also preferably devoid of inorganic flame retardants such as aluminum hydroxide and magnesium hydroxide.

The inventors have developed a series of antimony-free flame retardant formulations comprising at least one brominated FR and at least one phosphorus source, which are suitable for various epoxy-resin based applications, such as coatings, painting, composites and adhesive applications. These formulations form a flame resistant matrix comprising the brominated FR(s) along with the phosphorus source(s), embedded within an epoxy resin substrate.

It has been found that 2,4,6-tribromophenyl end-capped tetrabromobisphenol A epoxy-based flame retardants, also known by the name bis(2,4,6-tribromophenyl ether)-terminated tetrabromobisphenol A—epichlohydrin resin, as shown by Formula (I):

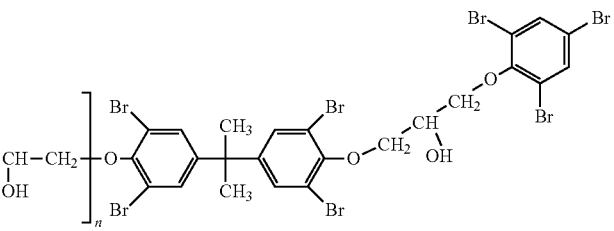

wherein n indicates the degree of polymerization (for example, with weight average molecular weight from 700 to 20,000, e.g., 700-3000), can effectively reduce the flammability of epoxy compositions for the preparation of coatings, with the aid of one or more phosphorus compounds, to attain UL 94 V-0 rating in the absence of antimony trioxide. It should be noted that the phosphorus compounds do not reduce the flammability of the compositions when used alone, even if applied at loading levels exceeding 35% by weight (based on the total weight of the composition, including the hardener). However, experimental results reported below demonstrate the effectiveness of a combination consisting of bromine-containing flame retardant of Formula (I) and one or more phosphorus-containing additives, in particular additives selected from the group consisting of:
(i) Ammonium polyphosphate;
(ii) Resorcinol bis (diphenyl phosphate); and
(iii) liquid alkylated triphenyl phosphate ester of the formula $O=P-(O-C_6H_5)_m(O-C_6H_4R_1)_{3-m}$, wherein m is 0, 1 or 2 and $R_1$ is $C_3$-$C_5$ alkyl, preferably t-butyl, or a mixture thereof ($C_6H_5$ and $C_6H_4$ indicate the phenyl ring).

The latter phosphorus-containing additive offers special advantages due to its ability to dissolve large quantities of tetrabromobisphenol A epoxy-based polymers, including the 2,4,6-tribromophenyl end-capped derivatives depicted above. The aforementioned liquid alkylated triphenyl phosphate esters can be used as individual compounds, but are often available in the market in the form of a mixture of alkylated triphenyl phosphate esters, consisting of mono-alkylphenyl diphenyl phosphate; di-alkylphenyl monophenyl phosphate and tri-alkylphenyl phosphate. Hereinafter we use the term "mixed alkylated triphenyl phosphate esters" to indicate such mixtures. For example, mixed butylated (primarily mono-t-butylphenyl) triphenyl phosphate ester is available from ICL-IP (Phosflex® 71B):

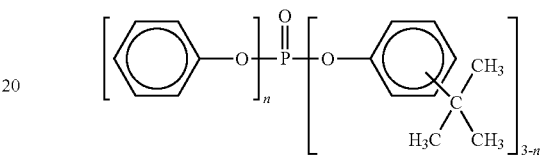

Experimental work conducted in support of this invention shows that the solubility of tetrabromobisphenol A epoxy-based polymers in a mixed alkylated triphenyl phosphate ester is surprisingly high. For example, solutions obtained upon dissolving tetrabromobisphenol A epoxy-based polymers in alkylated triphenyl phosphate ester (at concentration exceeding 30% and even higher than 40% based on the total weight of the solution) are stable against crystallization of the bromine-containing flame retardant down to very low temperatures. In fact solutions of tetrabromobisphenol A epoxy-based polymers in butylated triphenyl phosphate esters retained their original clarity over a wide temperature range, down to −25° C. under a seeding procedure for at least 14 days. Liquid mixed alkylated triphenyl phosphate ester (especially mixed t-butylated triphenyl phosphate esters such as Phosflex®71B) serves a twofold purpose: it is able to dissolve the tetrabromobisphenol A epoxy-based polymeric flame retardant in advance, to facilitate its addition to the curable epoxy composition for preparing coatings; and it reduces the flammability of the cured product (e.g., coating) in conjunction with the tetrabromobisphenol A epoxy-based polymeric flame retardant to provide substantially $Sb_2O_3$-free compositions.

Accordingly, one aspect of the invention relates to a curable epoxy composition for the preparation of coatings, comprising:

A) one or more epoxy resin(s),

B) 2,4,6-tribromophenyl end-capped tetrabromobisphenol A epoxy-based flame retardants, as shown by Formula (I):

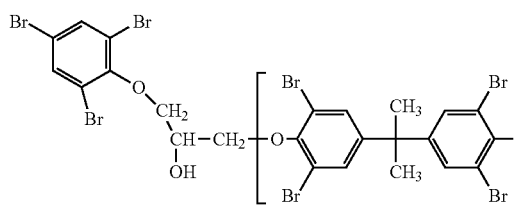
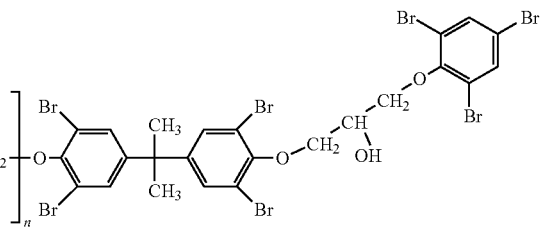

(for example, with weight average molecular weight from 700 to 20,000, e.g., 700-3000); and
C) phosphorus-containing compound, e.g., chosen from the group consisting of:
C1) Ammonium polyphosphate;
C2) Resorcinol bis (diphenyl phosphate); and
C3) liquid alkylated triphenyl phosphate ester of the formula O=P—(O—$C_6H_5$)$_m$(O—$C_6H_4R_1$)$_{3-m}$, wherein m is 0, 1 or 2 and $R_1$ is $C_3$-$C_5$ alkyl, preferably t-butyl, or a mixture thereof.

Another aspect of the invention relates a curable epoxy composition for the preparation of coatings, comprising:
A) one or more epoxy resin(s),
B) at least one bromine-containing flame retardant selected from the group of brominated epoxy and end-capped derivatives thereof of the formula (II):

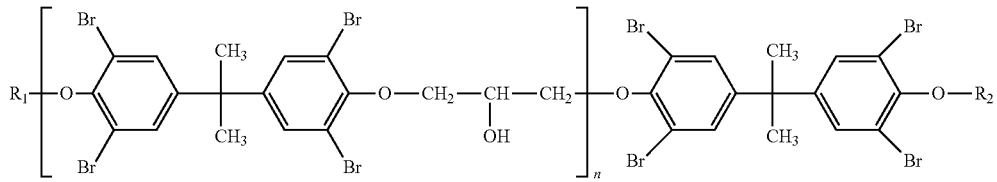

wherein n indicates degree of polymerization (for example, with weight average molecular weight from 700 to 20,000, e.g., 700-3000) and $R_1$ and $R_2$ are independently selected from the group consisting of:

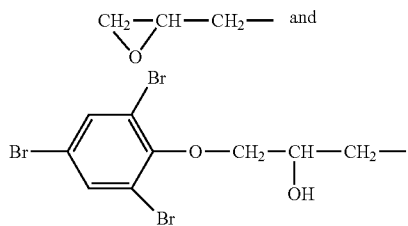

C) liquid alkylated triphenyl phosphate ester of the formula O=P—(O—$C_6H_5$)$_m$(O—$C_6H_4R_1$)$_{3-m}$, wherein m is 0, 1 or 2 and $R_1$ is $C_3$-$C_5$ alkyl, preferably t-butyl, or a mixture thereof.

It is noted that Formula II reduces to Formula I when the terminal units are 2,4,6-tribromophenol; flame retardants of Formula I and II are prepared by known methods (EP 467364; WO 2011/117865) and are commercially available, e.g., from ICL-IP; reduced particle size flame retardants can be used, e.g., with particles size distribution characterized by d99<25 µm, d90<15 µm and d50<5 µm (determined by light scattering particle size measurements using a Malvern Mastersizer as described in detail in WO 2015/036998, describing also dry milling techniques).

As shown above, the brominated FR may be either additive or reactive towards the epoxy resin.

The term "reactive flame retardants" is to be understood as meaning flame retardants which are reactive with at least one of the respective composition constituents and may therefore be incorporated into the particular coating compound, the adhesive/the sealing compound due to chemical bonding. That is, a bromiated epoxy of Formula (II) terminated with epoxide groups.

One preferred example of a reactive FR according to the present invention is brominated epoxy of Formula II with epoxide end groups such as F-2001 (CAS #68928-70-1) having average molecular weight from about 800 to 1200, e.g., around 1000.

The term "additive flame retardants" refers to flame retardants which are not reactive with the other composition constituents, and are merely mixed with them. That is, the end-capped brominated epoxy of Formula I.

One preferred example of an end-capped brominated epoxy is TexFRon® 4002 (2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol, CAS #135229-48-0).

The bromine content of the flame retardants of Formulas I and II is generally in the range from 48 to 60% by weight. They are added to the composition of the invention at a concentration sufficient to supply bromine content of at least 6% by weight, e.g., at least 7% by weight, for example, from 7 to 20% by weight (7-18%). In some embodiments of the invention, the bromine content of the substantially $Sb_2O_3$-free compositions is less than 15% by weight, e.g., from 10 to 15%, and in other embodiments it ranges from 6 to 10% by weight (based on the total weight of the as-applied composition, that is, the curable composition plus a curing agent to be added before application).

Accordingly, the concentration of the retardants of Formulas I and II in the composition may range from 10% to 28% by weight based on the total weight of the composition. For example, the concentration of brominated epoxy such as F-2001 is generally from 20 to 28% by weight. Experimental results reported below show that 2,4,6-tribromophenyl end-capped tetrabromobisphenol A epoxy-based flame retardant can be used at a fairly low loading level (e.g., from 10 to 15% by weight) when it is dissolved in advance in a mixed alkylated triphenyl phosphate ester such as Phosflex® 71B and the solution is combined with the epoxy resin (concentration based on the total weight of the as-applied composition, that is, the curable composition plus a curing agent to be added before application).

In general, the composition comprises 100 weight parts of an epoxy resin and from 15 to 60 weight parts of the bromine-containing flame retardants of Formula I or II; some preferred compositions contain from 15 to 30 weight parts of the 2,4,6-tribromophenyl end-capped tetrabromobisphenol A epoxy-based flame retardant of Formula I, in combination with 20 to 40 weight parts (e.g., 20-35) of a mixed alkylated triphenyl phosphate.

In the present invention, when the brominated FR is an additive FR, namely if it does not have a functional group that can react with the epoxy resin, it is useful to use small particles in order to avoid a poor distribution of the FR particles within the epoxy resin and to create smooth surfaces. Therefore, in the case of additive FRs (such as in Example 1 further below) small particle size distribution is beneficial.

Small particle size distribution can be achieved using conventional milling techniques, such that the particle size of at least 99% of the particles (d99) can be smaller than about 25 microns, preferably 15 microns and/or the particle size of at least 90% of the particles (d90) is smaller than about 15 microns, preferably 7.5 microns and/or the particle size of at least 50% of the particles (d50) is smaller than about 5 microns, preferably 3.5 microns.

The mills used commonly employ toughened ceramic, stainless steel or tungsten carbide to form the mill chambers and agitating paddles. Commonly used grinding media include zirconium oxide beads, which have a hardness approaching that of diamonds, or considerably softer grinding media based on polystyrene or other similar polymers.

Other milling methods, besides bead milling, include using roll mills, pearl mills, vibro-energy milling, high pressure water jets, ultrasonics and orifice extrusion methods.

Turning now to the phosphorus-containing flame retardants, they are preferably selected from a group consisting of an ammonium phosphate salt or an ammonium polyphosphate salt. More preferably, an aluminum ammonium polyphosphate is used (as described in U.S. Pat. No. 8,524,125, available from ICL-IP under the name TexFRon® AG). It may be partially replaced by liquid phosphate ester such as resorcinol bis (diphenyl phosphate); abbreviated "RDP" (commercially available from ICL-IP under the name Fyrolflex® RDP, or High Purity RDP, Fyrolflex® RDP-HP.

Preferably, however, the phosphorus source is the aforementioned mixed alkylated triphenyl phosphate ester (especially mixed t-butylated triphenyl phosphate esters such as Phosflex® 71B) that was shown to dissolve large quantities of bromine-containing flame retardants of Formula I or II, in particular 2,4,6-tribromophenyl end-capped tetrabromobisphenol A epoxy-based flame retardant to form stable concentrated solutions, which upon addition to an epoxy resin and hardening results in creation of transparent castings.

Hence another aspect of the invention is a method for preparing a curable epoxy composition, comprising dissolving in an alkylated triphenyl phosphate ester one or more bromine-containing flame retardants of Formula I or II, in particular 2,4,6-tribromophenyl end-capped tetrabromobisphenol A epoxy-based flame retardant, such that the concentration of said bromine-containing compound in the resultant solution is not less than 35% by weight, preferably not less than 40% by weight; and combining said solution with an epoxy resin. Curing is then effected upon addition of the curing agent as explained above.

It should be noted that milling is beneficial for all solid components in the additive systems. For example, if the phosphorus source is solid, such as TexFRon®AG, it too preferably undergoes milling, as described above.

Regarding the epoxy resins, the term "epoxy resin", as used herein, means an organic material containing free reactive oxirane (epoxide) groups, in particular a compound or mixture containing, on an average, more than one 1,2-epoxy group per molecule, which can be crosslinked into final form by means of a chemical reaction with a variety of curing agents used with or without heat. The end groups are commonly referred to as glycidyl ether groups. Epoxy resins are generally prepared by the polymerization of polyhydric phenols and an epoxide containing compound (e.g., epichlorohydrine) in the presence of a base. Epoxy resins based on bisphenol A [2,2-Bis(4-hydroxyphenyl)propane], 4,4'-dihydroxy diphenyl sulfone, hydroquinone and resorcinol are most commonly used in epoxy formulations. Especially suitable for use in the invention are epoxy resins based on bisphenol A. The resin used may have an epoxy equivalent weight in the range from 120 to 300 g/eq, for example, more specifically from 175 to 200 g/eq, with viscosity (at 25° C.) in the range from 500-15,000 cps, for example.

In general, epoxy resin may be either a "one part" or "two-part" resin. In a two-part epoxy, the resin and curing agent are kept separately, and are mixed at the last stage to initiate the curing reaction. In a one-part epoxy, the resin and curing agent are both present in the initial mixture.

Typically, they polymerize when heat is applied. Most one-part epoxies require temperatures of 125° to 150° C. for curing, although specialty grades now exist that cure at lower temperatures (80° to 100° C.). These are particularly useful for bonding heat-sensitive substrates. One-part epoxies tend to be more exothermic than two-part versions, and in most situations, are limited by curing depths of 0.25 inches or less.

The invention especially relates to a two-part epoxy, that is, the curable composition of the invention does not include a hardener/curing agent prior to use. The invention specifically provides curable compositions, passing UL 94 V-2/3.2 mm, UL 94 V-1/3.2 mm and most preferably UL 94 V-0/3.2 mm tests:

A) 100 weight parts of an epoxy resin;
B) from 15 to 30 weight parts of 2,4,6-tribromophenyl end-capped tetrabromobisphenol A epoxy-based flame retardant of Formula I; and
C) from 20 to 40 weight parts of alkylated triphenyl phosphate ester (e.g., mixed butylated triphenyl phosphate ester).

A) 100 weight parts of an epoxy resin;
B) 45 to 55 weight parts of brominated epoxy of Formula II (e.g., with molecular weight of 700-3000); and
C) from 20 to 30 weight parts of alkylated triphenyl phosphate ester (e.g., mixed butylated triphenyl phosphate ester).

A) 100 weight parts of an epoxy resin;
B) from 40 to 50 weight parts of 2,4,6-tribromophenyl end-capped tetrabromobisphenol A epoxy-based flame retardant of Formula I; and
C) from 30 to 40 parts by weight of ammonium polyphosphate (e.g., aluminum ammonium polyphosphate).

A) 100 weight parts of an epoxy resin;
B) from 40 to 60 weight parts of 2,4,6-tribromophenyl end-capped tetrabromobisphenol A epoxy-based flame retardant of Formula I; and
C) from 15 to 30 parts by weight of a mixture consisting of ammonium polyphosphate (e.g., aluminum ammonium polyphosphate) and Resorcinol bis (diphenyl phosphate).

Solvents, diluents, defoamers, fillers, pigments, wetting agents and other conventional additives may be included in the composition of the invention, but in some embodiments of the invention, the compositions are solvent-free.

Regarding the curing agents, amines and anhydrides are most commonly used. Examples include: aliphatic polyamines [such as alkylene diamines (ethylene diamine, diethylene triamine of the formula:

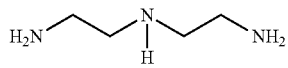

(commercially available from Huntsman Corporation under the name DETA) and triethylene tetramine], cycloaliphatic polyamines, aromatic polyamines [such as 4,4'-diamino diphenyl methane and 4,4'-diamino diphenyl sulfone], polyamides; amidoamines (formed by the reaction of fatty acids and ethylene diamine or diethylene triamine) and polyamidoamine/epoxy adducts. Regarding anhydrides, phthalic anhydride can be mentioned, alongside pyromellitic anhydride, maleic anhydride, chlorendic anhydride and dodecenylsuccinic ahydride. Curing with anhydrides is usually accelerated with the aid of tertiary amines.

The curable composition of the invention is intended for surface applications, e.g., to produce coatings, paints and adhesives upon curing. For example, it may be provided as part of a kit which comprises first and second components, the first component being the curable composition of the invention and the second component comprising a curing agent for said curable composition, such that said first component is stored separately from said second component until use. The compositions can be applied onto surfaces such as concrete, metal and wood and can afford transparent coatings. Hence the invention also provides a process for applying a coating or paint onto a surface, comprising curing the curable composition of the invention with the aid of a curing agent to form a fully cured coating or paint onto said surface. The use of bromine-containing flame retardants of Formula I and II in combination with the phosphorous-containing compounds as described above, for imparting retardancy to epoxy-based formulations for surface applications, form another aspect of the invention.

As pointed out above, the inventors have succeeded to dissolve brominated epoxy polymers FR, such as TexFron® 4002, in organic phosphorus flame retardant, such as Phosflex® 71B, to obtain a clear solution stable against crystallization at low temperatures. This FR solution was successfully integrated in a clear wood lacquer—solvent based or 100% solids (polyurethane and others). The solution, comprising a mixed alkylated triphenyl phosphate ester as a solvent and the aforementioned bromine-containing flame retardants of Formula I and II dissolved therein at a concentration from 20 to 45%, depending on the brominated FR, e.g., from 30 to 44%, form another aspect of the invention.

EXAMPLES

Materials and Methods
Brominated Flame Retardants Polymers

TexFRon®4002 (2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol, CAS #135229-48-0); and F-2001 (CAS #68928-70-1, Tetrabromobisphenol A-tetrabromobisphenol A diglycidyl ether copolymer) were obtained from ICL-IP.

Phosphorus-Containing Compounds

Phosflex®71B (butylated triphenyl phosphate ester, CAS Numbers: 56803-37-3 and 65652-41-7 and 78-33-1); Resorcinol-bis(diphenylphosphate) (Fyrolflex® RDP, or High Purity RDP, Fyrolflex® RDP-HP, CAS #125997-21-9); and TexFRon®AG (Aluminum Ammonium polyPhosphate, CAS #1050443-25-8 were obtained from ICL-IP.

Epoxy Resins and Curing Agents

EPOKUKDO YD-127 (CAS 25068-38-6, Epoxy Resin derived from Bisphenol-A), EPOKUKDO YD-114EF (CAS 25068-38-6 & 9003-36-5 & 68609-97-2, Bisphenol-A/F type liquid Epoxy Resin diluted with aliphatic glycidyl ether, low viscosity) and DOMIDE GX-533 (CAS 68953-36-6 & 112-57-2 & 26142-30-3, Polyamidoamine/Epoxy adduct) were received from KUKDO Chemical Co., Ltd.

D.E.R.™ 331 Liquid Epoxy Resin (CAS 25085-99-8, a liquid reaction product of bisphenol A and epichlorohydrin) and DETA (CAS 111-40-0, Diethylenetriamine) were received from DOW Chemical Co., Ltd.

Auxiliary Additives

BYK-A500 (air release additive) was obtained from BYK-Chemie GmbH. CLiQSMART AF (defoamer) was obtained from Cliq Swiss Tech AG.

Flammability Tests:

Flammability UL 94 V is a method of evaluating both the burning and afterglow times after repeated flame application and dripping of the burning test specimen (see table). Each specimen was mounted with long axis vertical and supported such that its lower end is 10 mm above a Bunsen burner tube. A blue 20 mm high flame is applied to the center of the lower edge of the specimen for 10 seconds and removed. If the burning ceases within 30 seconds, the flame is reapplied for an additional 10 seconds. Five samples are needed for each formulation. If the time for even one sample (out of the five) is longer than 30 seconds then the test is noted as NR (=not rated).

| Flammability rating UL 94 | | | |
|---|---|---|---|
| Time in seconds | V-0 | V-1 | V-2 |
| Burning time after flame application (10 s) | ≤10 | ≤30 | ≤30 |
| Total burning time (for 5 samples, two applications) | ≤50 | ≤250 | ≤250 |
| Burning and afterglow times of specimens after second flame application (s) | ≤30 | ≤60 | ≤60 |
| Dripping of burning specimens (ignition of cotton batting) | no | no | yes |
| Specimens completely burned | no | no | no |

Examples 1-6 (Reference/Comparative) and 7-9 (of the Invention)

Application of an Additive FR to Prepare Epoxy Flame-Retarded System

An epoxy resin was used as a casting compound to be flame retarded by the formulation of the present invention. The high viscosity epoxy resin (EPOKUKDO YD-127 or D.E.R.™ 331) was stirred by a Dissolver stirrer (R 1303

Dissolver stirrer IKA with EUROSTAR power control-visc motor, IKA) at 400 RPM speed. At 1500 RPM speed, defoamer (Byk-A500 or CLiQSMART AF) was added followed by the addition of at least one phosphorus source: Fyrolflex® RDP, and/or TexFRon®AG, and end-capped brominated epoxy FR (TexFRon®4002). The speed was lowered to 500 RPM and stirring was continued for 20 minutes.

The curing agent (DOMIDE GX-533 or DETA) was introduced into the mixture and stirring was continued for 5 minutes.

The formulation was poured into a silicone mold to create models UL 3.2 mm thick, and was dried for 48 hours at room temperature (ambient curing). White opaque samples were formed. The flame retardancy UL-94V test was conducted after a week.

The different samples and results are shown in Table 1 below. The compositions are described in terms of percent by weight and weight in grams for each individual component. Reference Examples (compositions free of flame retardants) are indicated by the abbreviation "Ref"; Comparative Examples (compositions with flame retardants but not within the invention) are indicated by abbreviation "Com".

Examples 10-13 (Reference/Comparative) and 14-16 (of the Invention)

Application of Reactive FR to Prepare Epoxy Flame-Retarded System

An epoxy resin was used as a casting compound to be flame retarded by the formulation of the present invention. The epoxy resin (EPOKUKDO YD-114EF or D.E.R.™ 331) was stirred by a Dissolver stirrer (R 1303 Dissolver stirrer IKA with EUROSTAR power control-visc motor, IKA) at 400 RPM speed. At 1500 RPM speed, Defoamer (Byk-A500 or CLiQSMART AF) was added followed by the slow addition of the reactive brominated epoxy FR (F-2001) till full dissolution was observed. After clear solution was obtained, Phosflex®71B was added while maintaining the stirring. The speed was lowered to 500 RPM and stirring was continued for 20 minutes.

The curing agent (DOMIDE GX-533 or DETA) was introduced into the mixture and stirring was continued for 5 minutes.

The formulation was poured into a silicone mold to create models UL 3.2 mm thick, and was dried for 48 hours at room temperature (ambient curing). Transparent samples were formed. The UL-94V test was conducted after a week.

The different samples and results are shown in Table 2 below. All samples were transparent. The compositions are described in terms of percent by weight and weight in grams for each individual component. Reference Examples (compositions free of flame retardant) are indicated by the abbreviation "Ref"; Comparative Examples (compositions with flame retardants but not within the invention) are indicated by abbreviation "Com".

TABLE 1

| Example | 1 Ref | 2 Ref | 3 Com | 4 Com | 5 Com | 6 Com | 7 | 8 | 9 |
|---|---|---|---|---|---|---|---|---|---|
| Composition (% by weight) | | | | | | | | | |
| Epoxy resin | 65% | | 41.2% | 41.2% | 41.2% | 41.2% | 41.5% | 41.2% | |
| YD-127 | 25.9 g | | 25.9 g | 25.9 g | 25.9 g | 25.9 g | 25.9 g | 20.6 g | |
| Epoxy resin | | 87.5% | | | | | | | 56.1% |
| D.E.R 331 | | 61.6 g | | | | | | | 50 g |
| Curing agent | 35% | | 22.2% | 22.2% | 22.2% | 22.2% | 22.3% | 22.2 | |
| Domide GX-333 | 13.9 g | | 13.9 g | 13.9 g | 13.9 g | 13.9 g | 13.9 g | 11.1 g% | |
| Curing agent | | 11.9% | | | | | | | 7.5% |
| DETA | | 8.4 g | | | | | | | 6.7 g |
| TexEron ® 4002 | | | 36% | — | — | — | 20% | 25% | 24.7% |
| | | | 22.4 g | | | | 12.4 g | 12.5 g | 22 g |
| TexFron ® AG | | | — | 36% | — | 20% | 16% | 7% | 7% |
| | | | | 22.4 g | | 12.4 g | 10 g | 3.5 g | 6.2 g |
| RDP | | | — | — | 36% | 16% | — | 4% | 3.9% |
| | | | | | 22.4 g | 10 g | | 2 g | 3.5 g |
| % Br (calculated) | | | 20.16 | 0 | 0 | 0 | 11.2 | 14 | 13.8 |
| % P (calculated) | | | 0 | 7.2 | 3.8 | 5.7 | 3.2 | 1.8 | 1.8 |
| Defoamer | 0.4% | 0.6% | 0.4% | 0.4% | 0.4% | 0.4% | 0.4% | 0.4% | |
| (Byk-A 500) | 0.2 g | 0.4 g | 0.25 g | 0.25 g | 0.25 g | 0.25 g | 0.25 g | 0.25 g | |
| Defoamer | | | | | | | | | 0.8% |
| (Cliqsmart AF) | | | | | | | | | 0.7 g |
| Properties (UL 94 flammability test: on 3.2 mm thick specimens) | | | | | | | | | |
| NR | | NR | V-1 | NR | NR | NR | V-0 | V-0 | V-0 |

TABLE 2

| Example | 10 Ref | 11 Ref | 12 Com | 13 | 14 | 15 | 16 |
|---|---|---|---|---|---|---|---|
| Composition (% by weight) | | | | | | | |
| Epoxy resin YD-114 EF | 65% 100 g | | 47.7% 68 g | 45.7% 68 g | 42.7% 68 g | | |
| Epoxy resin D.E.R 331 | | 87.5% 61.6 g | | | | 52.7% 68 g | 50.4% 68 g |
| Curing agent Domide GX-333 | 34.5% 53 g | | 29.4% 42 g | 28.2 42 g | 26.4% 42 g | | |
| Curing agent DETA | | 11.9% 8.4 g | | | | 8.5% 11 g | 8.1% 11 g |
| F-2001 | | | 22.4% 32 g | | 20.1% 32 g | 24.8% 32 g | 27.4% 37 g |
| Phosflex ® 71B | | | 25.6% 38 g | 10.2% 16.3 g | 12.8% 16.5 g | 13.3% 18 g | |
| % Br (calculated) | | | 11.2 | 0 | 10.05 | 12.5 | 13.7 |
| % P (calculated) | | | 0 | 2.17 | 0.86 | 1.09 | 1.13 |
| Defoamer (Byk-A 500) | 0.5% 0.7 g | 0.6% 0.4 g | 0.5% 0.7 g | 0.5% 0.7 g | 0.5% 0.7 g | 0.6% 0.8 g | |
| Defoamer (Cliqsmart AF) | | | | | | 0.6% 0.8 g | 0.7% 1 g |
| Properties (UL 94 flammability test: on 3.2 mm thick specimens) | | | | | | | |
| | NR | NR | NR | NR | V-2 | V-2 | V-0 |

Example 17

Dissolution Behavior of Brominated Flame Retardants in Phosphorus-Containing Liquids Various (non-halogenated) phosphorus flame retardant liquids were tested for their ability to dissolve solid bromine-containing flame retardants. A vessel was charged with the liquid phosphorus compound, followed by slow addition of the solid bromine-containing flame retardant under stirring with the aid of R 1303 Dissolver stirrer IKA with EUROSTAR power control-visc motor, IKA; typically stirring rate was about 800 rpm. Solutions were then tested for stability against crystallization of the bromine-containing compound at low temperature, down to −25° C. (with seeding). The following phosphorus-containing liquids were tested as potential solvents for bromine-containing flame retardants:

Phosflex® 71B; t-butylated triphenyl phosphate mixture of the formula (commercially available from ICL-IP):

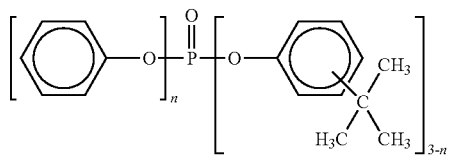

Fyrol® 6; diethyl N,N bis (2-hydroxyethyl aminoethyl phosphonate of the formula (commercially available from ICL-IP):

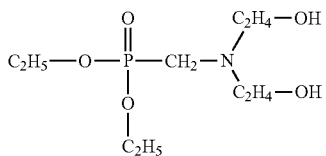

Fyrolflex® RDP-HP; Resorcinol-bis(diphenylphosphate of the formula (commercially available from ICL-IP):

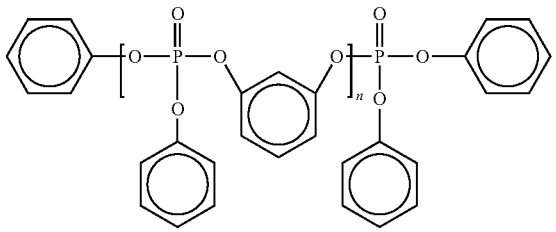

VeriQuel™ R100; a phosphorus-rich reactive flame retardant, (commercially available from ICL-IP).

As to the solid bromine-containing flame retardants, in addition to F-2001 and Texfron® 4002, a non-polymeric, phosphorus and bromine-based flame retarding agent was also investigated to determine its solubility in the solvents studied (Tris(tribromoneopentyl) phosphate, commercially available from ICL-IL as FR-370).

The maximal loading level achieved for a bromine-containing FR in the liquid phosphorus-based compound is tabulated below.

TABLE 3

| | Phosflex ® 71B | Fyrol ® 6 | Fyrolflex ® RDP-HP | VeriQuel ® R100 |
|---|---|---|---|---|
| FR-370 | <9% | <9% | <9% | <9% |
| F-2001 | 37.5% | <9% | <9% | <15% |
| Texfron ® 4002 | 43.8% | <15% | <9% | <9% |

Phosflex® 71B emerges as an excellent solvent for bromine-containing flame retardants of Formulas I and II, enabling the formation of fairly concentrated solutions of the bromine-containing epoxy FR's, especially for TexFron® 4002.

Examples 18-19 (Reference) and 20 to 22 (of the Invention)

Application of an Additive FR to Prepare Transparent Epoxy Flame-Retarded Systems First Step:

A solution of Phosflex® 71B and TexFRon® 4002 as described in the previous example was prepared. To a vessel which contains Phosflex® 71B, TexFRon® 4002 was slowly added during stirring (800 rpm, R 1303 Dissolver stirrer IKA with EUROSTAR power control-visc motor, IKA). The addition is continued reaching 43.8% loading level of Tex-FRon® 4002 in the mixture. A viscous solution was obtained, which is stable against crystallization down to −25° C.

Second Step:

An epoxy resin (either EPOKUKDO YD-114EF or D.E.R.™ 331) was stirred by a Dissolver stirrer (R 1303 Dissolver stirrer IKA with EUROSTAR power control-visc motor, IKA) at 400 RPM speed. At 1500 RPM speed, Byk-A 500 was added followed by the slow addition of the Phosflex® 71B/TexFRon®4002 solution prepared in step 1 to obtain a clear homogeneous mixture. Then stirring speed was lowered to 500 RPM and stirring was continued for 20 minutes.

The curing agent (DOMIDE GX-533 or DETA) was then introduced into the mixture and stirring was continued for additional 5 minutes.

The formulation was poured into a silicone mold to create models UL 3.2 mm thick, and was dried for 48 hours at room temperature (ambient curing). Transparent samples were formed. The flame retardancy UL-94V test was conducted a week later.

The different samples and results are shown in Table 4 below. The compositions are described in terms of percent by weight and weight in grams for each individual component. Reference Examples (compositions free of flame retardant) are indicated by the abbreviation "Ref".

TABLE 4

| Example | 18 Ref | 19 Ref | 20 | 21 | 22 |
|---|---|---|---|---|---|
| Composition (% by weight) | | | | | |
| Epoxy resin YD-114 | 65% 100 g | | 48.5% 21.8 g | | |
| Epoxy resin D.E.R 331 | | 87.5% 61.6 g | | 65.1% 26 g | 58.5% 17.5 g |
| Curing agent Domide GX-333 | 34.5% 53 g | | 26% 11.74 g | | |
| Curing agent DETA | | 11.9% 8.4 g | | 9.4% 3.76 g | 8% 2.4 g |
| Texfron ® 4002 | | | 11% 4.92 g | 11% 43.8 g | 14.5% 4.4 g |
| Phosflex ® 71B | | | 14% 6.3 g | 14% 5.6 g | 18.5% 5.6 g |

TABLE 4-continued

| Example | 18 Ref | 19 Ref | 20 | 21 | 22 |
|---|---|---|---|---|---|
| % Br (calculated) | | | 6.2 | 6.2 | 8.10 |
| % P (calculated) | | | 1.19 | 1.19 | 1.57 |
| Defoamer (Byk-A 500) | 0.5% 0.7 g | 0.6% 0.4 g | 0.4% 0.18 g | 0.4% 0.16 g | 0.4% 0.12 g |
| Properties (UL 94 flammability test on 3.2 mm thick specimens) | | | | | |
| | NR | NR | V-2 | V-2 | V-0 |

The invention claimed is:

1. A curable epoxy composition suitable for surface applications, comprising:
   A) 100 parts by weight of one or more epoxy resin(s);
   B) from 15 to 60 parts by weight of 2,4,6-tribromophenyl end-capped tetrabromobisphenol A epoxy-based flame retardant of Formula (I):

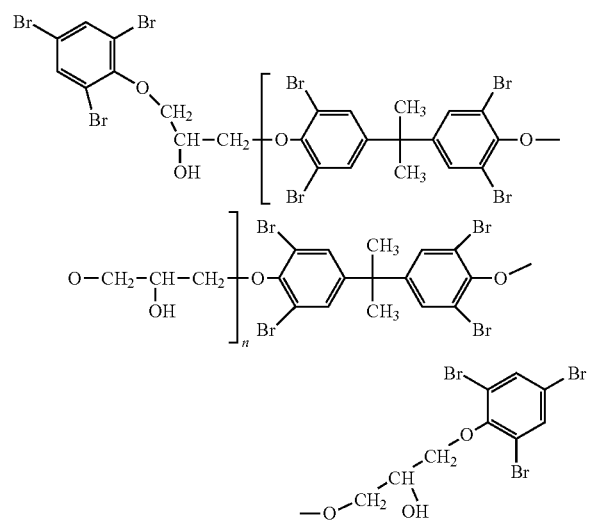

wherein n indicates the degree of polymerization; and
   C) from 15 to 40 parts by weight of a mixture of aluminum ammonium polyphosphate and resorcinol bis (diphenyl phosphate), and wherein the composition is substantially $Sb_2O_3$-free.

2. A curable epoxy composition according to claim 1, comprising:
   A) 100 parts by weight of one or more epoxy resin(s);
   B) from 40 to 60 parts by weight of the 2,4,6-tribromophenyl end-capped tetrabromobisphenol A epoxy-based flame retardant of Formula I; and
   C) from 15 to 30 parts by weight of a mixture consisting of aluminum ammonium polyphosphate and resorcinol bis (diphenyl phosphate).

3. A kit comprising first and second components, the first component being the curable composition of claim 1, and the second component comprising a curing agent for said curable composition, such that said first component is stored separately from said second component until use.

4. A process for applying a coating or a paint onto a surface, comprising curing the curable composition of claim 1 with the aid of a curing agent to form a fully cured flame retarded coating or paint onto said surface.

5. A kit comprising first and second components, the first component being the curable composition of claim 2, and the second component comprising a curing agent for said curable composition, such that said first component is stored separately from said second component until use.

6. A process for applying a coating or a paint onto a surface, comprising curing the curable composition of claim 2 with the aid of a curing agent to form a fully cured flame retarded coating or paint onto said surface.

* * * * *